July 3, 1928.
J. L. McATREE
LIPSTICK
Filed July 30, 1926
1,675,365
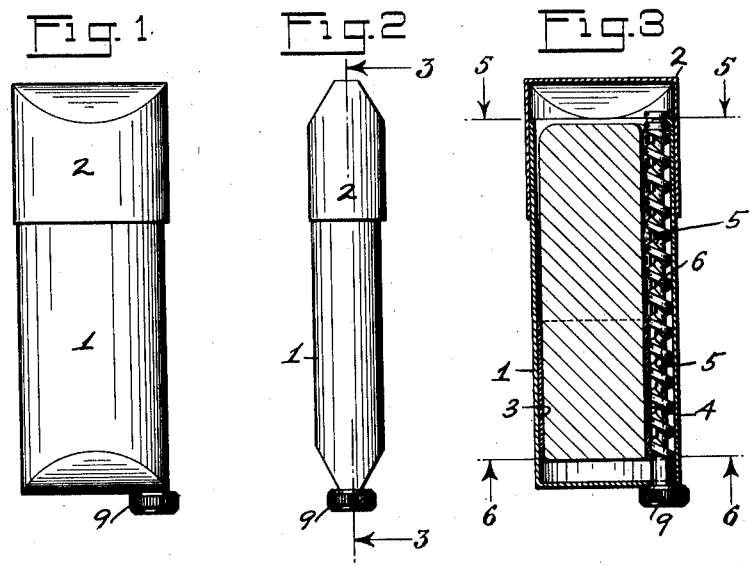
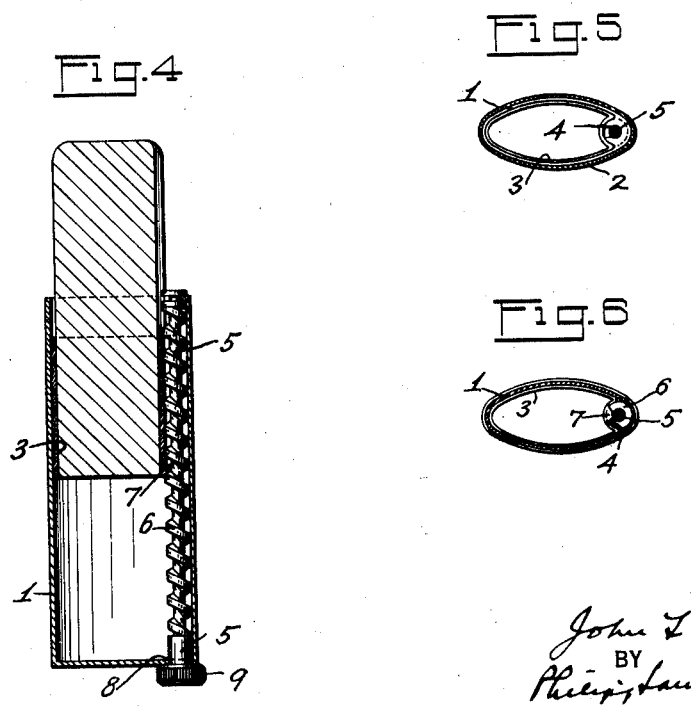
INVENTOR
John L. McAtree
BY
Philip Lawyer Richards
ATTORNEYS Patented July 3, 1928.

1,675,365

UNITED STATES PATENT OFFICE.

JOHN L. McATREE, OF NEW YORK, N. Y., ASSIGNOR TO SCOVILL MANUFACTURING COMPANY, OF WATERBURY, CONNECTICUT, A CORPORATION OF CONNECTICUT.

LIP STICK.

Application filed July 30, 1926. Serial No. 125,899.

This invention relates to certain improvements in lipsticks, and particularly to ejector mechanism for ejecting the stick from its casing.

In certain types of lipsticks, the stick is carried in a casing and is ejected from the casing for use and returned into the casing after use. In constructions where the casing is round, this is done by providing an outer casing, an inner casing having a slot, and a stick holder having a part engaging with the slot and some sort of a rotary actuator for giving the casing a sliding movement. These constructions are satisfactory where the casing is round, but it frequently happens that for certain purposes it is desirable to produce a casing oval or ovate in shape. Where such casings are used, the stick holder is given a sliding movement in an inner casing provided with a longitudinal slot extending the length of the casing, this inner casing being covered with an outer casing.

It is a special object of the invention to provide a lipstick container of oval or ovate shape which shall include only an outer casing and a stick holder in which the holder may be ejected from the casing and returned thereto without the necessity of providing an inner casing, or any slot in the casing in which the holder is carried.

A further object of the invention is to produce an ejecting device for this class of lipstick cases which shall be simple and of few parts so that it can be commercially produced at low cost and at the same time produce a neat and attractive article.

With these and other objects not specifically referred to in view, the invention consists in certain novel parts, arrangements and combinations which will be described in connection with the accompanying drawings and the novel features pointed out in the claims hereunto annexed In these drawings,—

Figure 1 is a side view of the improved casing;

Figure 2 is an edge view thereof;

Figure 3 is a vertical cross-sectional view, the section being taken on line 3—3 of Fig. 2, the parts being shown in closed position;

Figure 4 is a similar sectional view with the top removed and the stick projected for use, and Figures 5 and 6 are detail sectional views taken respectively on lines 5—5 and 6—6 of Fig. 3.

Referring now to these drawings, the improved lipstick includes a casing 1 and a cover 2 therefor, this cover telescopically engaging the casing. The casing and cover are, as shown oval in shape, and mounted to have a longitudinal sliding movement in the casing is a stick holder 3, this stick holder having throughout most of its extent a close frictional engagement with the inner walls of the casing. This holder is, as shown, of oval shape, but at one edge thereof is indented to form a groove or track 4, in which works an ejector 5 in the form of a screw, the threads of which are indicated at 6.

The holder is formed with a part, such as a projection 7, Figs. 4 and 6, which extends into the path of the screw and is engaged thereby, so that by turning the screw the holder is given a longitudinal sliding movement in the casing. This screw ejector, when the ejector is in the form of a screw, is passed through an aperture 8 in the bottom of the casing and is held in position by engaging between the wall of the casing and the track or groove of the holder. This screw is provided exteriorly of the casing with a milled head 9 by which it can be manipulated. It will thus be seen that provision has been made for ejecting a stick holder in a casing of oval or ovate shape in which only a single casing and holder are required. Except for the perforation in the bottom of the casing, the casing walls are imperforate, thus a very simple article has been produced and one which can be made commercially at low cost and easily and quickly assembled.

While the invention has been shown and described in its preferred forms, it will be understood that various forms of ejector may be used and the invention is not to be restricted to the precise details shown and described.

What I claim is:

1. In a lipstick, the combination of a single outer casing and a cover therefor both oval in cross section, an oval rouge stick holder in the casing, a groove in a thin edge of the stick holder, a projection on the holder extending into the groove, and a propeller in the casing out of contact with the rouge and engaging the groove for sliding the holder longitudinally of the casing.

2. In a lipstick, the combination of a single outer casing and a cover therefor both oval in cross section, an oval rouge stick holder, a groove in a thin edge of the stick holder, a projection adjacent the groove of the holder, and a screw propeller in the casing out of contact with the rouge and with which the projection engages for sliding the holder longitudinally of the casing.

3. In a lipstick, the combination of a single outer casing and a cover therefor both oval in cross section, an oval rouge stick holder frictionally engaging the inner walls of the casing, a groove in a thin edge of the stick holder, a projection adjacent the groove of the holder, and a screw rod held in the casing between the holder and the side of the casing out of contact with the rouge and working in the groove for giving the holder a longitudinal sliding movement in the casing.

In testimony whereof, I have hereunto set my hand.

JOHN L. McATREE.